United States Patent [19]

Parker

[11] 4,331,982
[45] May 25, 1982

[54] SAMPLE AND HOLD CIRCUIT PARTICULARLY FOR SMALL SIGNALS

[75] Inventor: Robert P. Parker, Indianapolis, Ind.

[73] Assignee: RCA Corporation, New York, N.Y.

[21] Appl. No.: 190,597

[22] Filed: Sep. 25, 1980

[51] Int. Cl.³ .............................................. H01N 5/68
[52] U.S. Cl. ..................... 358/243; 358/27; 358/74
[58] Field of Search .................. 358/27, 25, 34, 64, 358/65, 74, 171, 172, 243; 328/139, 150, 151, 168-175; 307/350, 351, 352, 353

[56] References Cited

U.S. PATENT DOCUMENTS

| 2,792,496 | 5/1957 | Rhodes | 358/172 |
|---|---|---|---|
| 2,863,943 | 12/1958 | Luther | 358/172 |
| 2,930,843 | 3/1960 | Cooper | 358/34 |
| 3,543,169 | 11/1970 | Hill | 358/171 |
| 4,200,882 | 4/1980 | Janssen | 358/74 |
| 4,209,808 | 6/1980 | Harwood | 358/74 |
| 4,216,396 | 8/1980 | Balaban | 328/151 |
| 4,224,640 | 9/1980 | Hovens | 358/74 |
| 4,263,521 | 4/1981 | Senger | 328/151 |

OTHER PUBLICATIONS

Cohen, "Sample and Hold Circuits Using FET Analog Gates", EEE.
Burd et al., "High Performance Sample and Holds", Electronics Engineer, Dec. 1967, pp. 60-64.
National Semiconductor Linear Applications Handbood, p. AN20-7.

Primary Examiner—Michael A. Masinick
Attorney, Agent, or Firm—Eugene M. Whitacre; Paul J. Rasmussen; Ronald H. Kurdyla

[57] ABSTRACT

A signal sampling circuit comprising a signal inverting amplifier with a gain greater than unity, an input clamp network including a feedback switch, and an output sampling network including a charge storage device and a sampling switch is disclosed. The amplifier input to which signals to be sampled are applied is clamped to the amplifier output potential via the feedback switch during non-sampling, clamping intervals. During subsequent sampling intervals, the feedback switch is disabled and the sampling switch is enabled to couple the amplifier output to the storage device, so that the storage device develops a voltage sample of amplifier output signals referenced to the clamping potential.

16 Claims, 5 Drawing Figures

SAMPLE AND HOLD CIRCUIT PARTICULARLY FOR SMALL SIGNALS

This invention concerns an arrangement particularly suitable for sampling a characteristic of a low level electrical signal in a manner which significantly reduces output errors due to sampling offsets otherwise associated with the sampling process, to reduce distortion of the output sample.

In signal processing systems such as a television receiver for processing a composite television signal, there is a need to sample information contained in signals processed by the system. It is often necessary to provide significant amplification in the sampling process in order to obtain an information sample with a level large enough to be utilized effectively by circuits which are intended to process the information sample. This requirement is evident, for example, in a system for automatically controlling the bias of a kinescope in a color television receiver, as disclosed in a copending U.S. patent application Ser. No. 134,656 of W. Hinn, now U.S. Pat. No. 4,277,798 titled, "Automatic Kinescope Biasing System With Increased Interference Immunity" for example. In this system it is necessary to sample the (variable) amplitude of a small pulse of a few millivolts peak-to-peak amplitude, for the purpose of developing a control signal capable of automatically controlling kinescope bias over a range of several volts.

The need for amplifying low level signals in the sampling process requires that voltage offsets associated with the sampling process be held to a minimum, and that the offsets not be amplified together with the information being sampled. Otherwise, the offsets are likely to distort or obscure the output information sample. Accordingly, a signal sampling arrangement disclosed herein provides a predictably referenced output sample with significantly reduced output errors such as may be due to sampling offsets. More specifically, a high gain sampling circuit is disclosed wherein any sampling offsets that may exist are not amplified in the sampling process.

In accordance with the present invention, a circuit for sampling an input signal having a reference interval and a signal interval including a characteristic to be sampled comprises an amplifier with a signal input and an output, a clamping network coupled to the amlifier signal input, and an output signal processing network. Also included are a switching network coupled to the amplifier output, to the clamping network, and to the signal processing network. The switching network is timed to operate in response to timing signals including a clamping interval component corresponding to the reference interval of the input signal, and a sampling interval component corresponding to the signal interval of the input signal. During the clamping intervals, the switching network operates to couple the amplifier output to the clamping network at the amplifier input via a negative feedback path, and to decouple the amplifier output from the signal processing network. During the sampling intervals, the switching network operates to disable the negative feedback path, and to couple the amplifier output to the signal processing network.

In accordance with a feature of the invention, the sampling circuit is included in a system for automatically controlling the black level current conducted by a kinescope in a television receiver, for deriving a signal sample representative of the level of kinescope black level current conduction.

Figure 1:
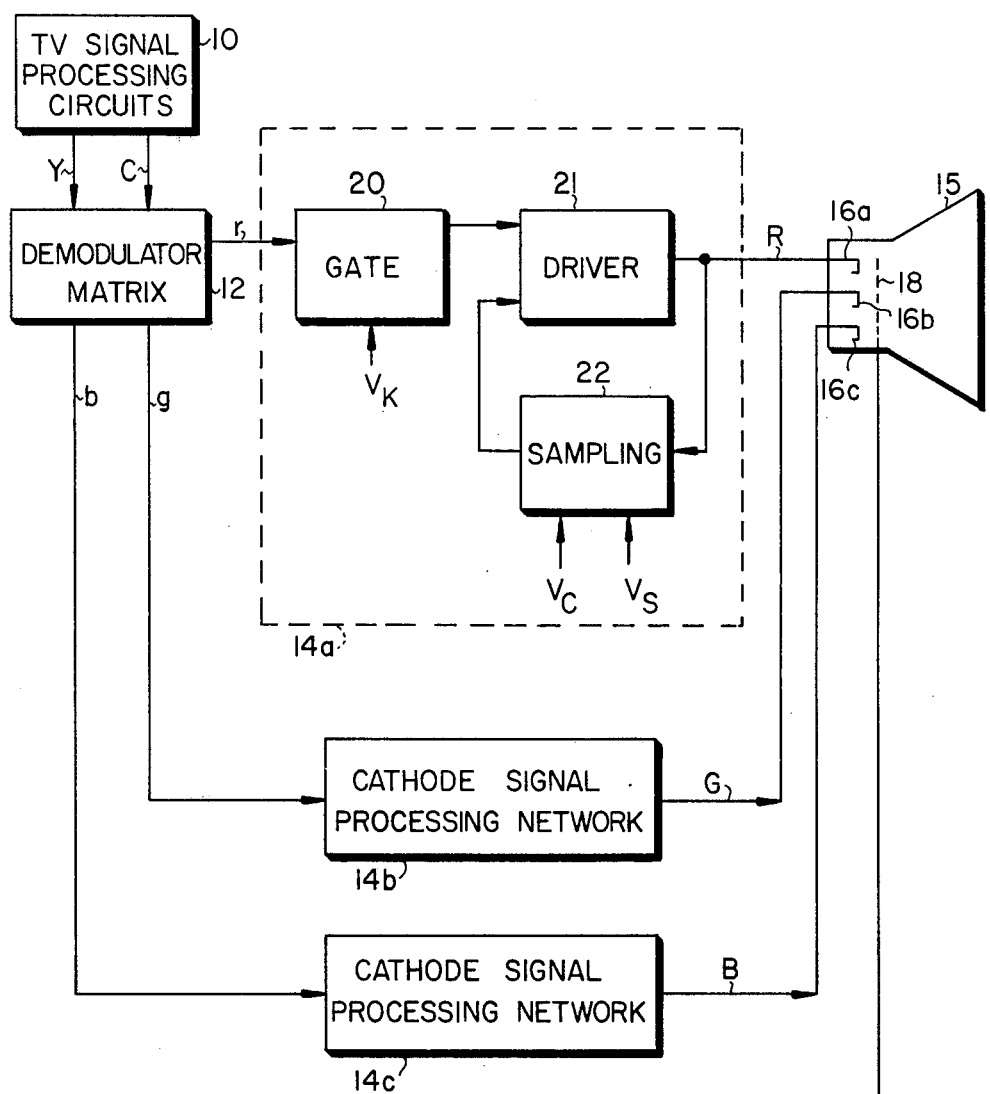
FIG. 1 illustrates a block diagram of a portion of a color television receiver including apparatus according to the present invention.
Figure 1:
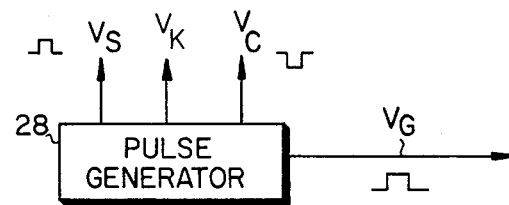

In FIG. 1, television signal processing circuits 10 (e.g., including video detector, amplifier and filter stages) provide separated luminance (Y) and chrominance (C) components of a composite color television signal to a demodulator-matrix 12. Matrix 12 provides output low level color image representative signals r, g and b. These signals are amplified and otherwise processed by circuits within kinescope cathode signal processing networks 14a, 14b and 14c, respectively, which supply high level amplified color image signals, R, G and B to respective cathode intensity control electrodes 16a, 16b and 16c of a color kinescope 15. In this example, kinescope 15 is of the self-converging in-line gun type with a commonly energized grid 18 associated with each of the electron guns comprising cathode electrodes 16a, 16b and 16c. Since cathode signal processing networks 14a, 14b and 14c are similar in this embodiment, the following discussion of network 14a also applies to networks 14b and 14c.

In network 14a, a keyed gate 20 (e.g., an analog electronic switch) couples and decouples the r signal output from matrix 12 to a video signal input of a kinescope driver 21 in response to a keying signal $V_K$ produced by a pulse generator 28. Driver stage 21 includes a signal amplifier network for developing high level output signal R which is applied to kinescope cathode 16a. Cathode 16a is coupled to an input of a sampling network 22. Sampler 22 is keyed by a timing signal $V_C$ and by a timing signal $V_S$ (a complementary phase version of signal $V_C$) also produced by pulse generator 28, for developing an output control signal which is supplied to a bias control input of driver 21 for modifying the bias of amplifier circuits within driver 21 to control the black level current conducted by cathode 16a, as will be discussed.

Pulse generator 28 also generates an output voltage pulse $V_G$ during periodic intervals when the cathode current of kinescope 15 is to be monitored. This pulse exhibits a positive polarity and fixed amplitude (e.g., within a range of 10 to 20 volts), and is applied to kinescope grid 18 for forward biasing grid 18 during the monitoring intervals. The output of pulse generator 28 from which signal $V_G$ is provided also supplies an appropriate bias voltage for grid 18 at times other than the grid pulse interval.

Signals $V_S$, $V_C$, $V_K$ and $V_G$ from pulse generator 28 are synchronized with respect to the horizontal (line) retrace blanking intervals and the vertical (field) retrace blanking intervals of the television signal. These signals are generated during a period of time after the end of vertical retrace blanking, but before the beginning of the picture interval of the television signal containing picture information to be displayed by the kinescope. That is, these signals are generated during a portion of a larger time interval that encompasses a few horizontal lines during which picture information is absent. Specifically, signal $V_K$ renders gate 20 nonconductive for a period of time encompassing a reference or "set-up" interval of approximately four horizontal lines duration during which signal $V_C$ is developed, and a subsequent monitoring interval of approximately two horizontal lines duration during which signals $V_G$ and $V_S$ are developed.

During the monitoring interval, the kinescope functions as a cathode follower in response to grid pulse $V_G$, wherein a similarly phased version of grid pulse $V_G$ appears at the kinescope cathode electrode during the monitoring interval. The amplitude of the induced cathode pulse is proportional to the level of cathode black level current conduction but is attenuated significantly relative to the grid pulse due to the relatively low forward transconductance of the kinescope electron gun grid drive characteristic. The amplitude of the induced cathode output pulse typically is very small, on the order of a few millivolts in this example.

Signal $V_K$ disables gate 20 during the reference and monitoring intervals so that the output of matrix 12 is decoupled from driver 21 and kinescope 15. Sampling network 22 operates in response to signals $V_C$ and $V_S$ to provide an amplified output sample representative of the magnitude of the cathode output pulse induced by signal $V_G$. The output sample from network 22 is utilized to modify the bias operating point of driver 21, if necessary, in a direction to develop a (cathode) bias level at the output of driver 21 sufficient to produce a desired correct level of cathode black level current by closed loop action. Gate 20 is rendered conductive at other times to permit signals from matrix 12 to be coupled to the kinescope via driver 21.

Figure 2:
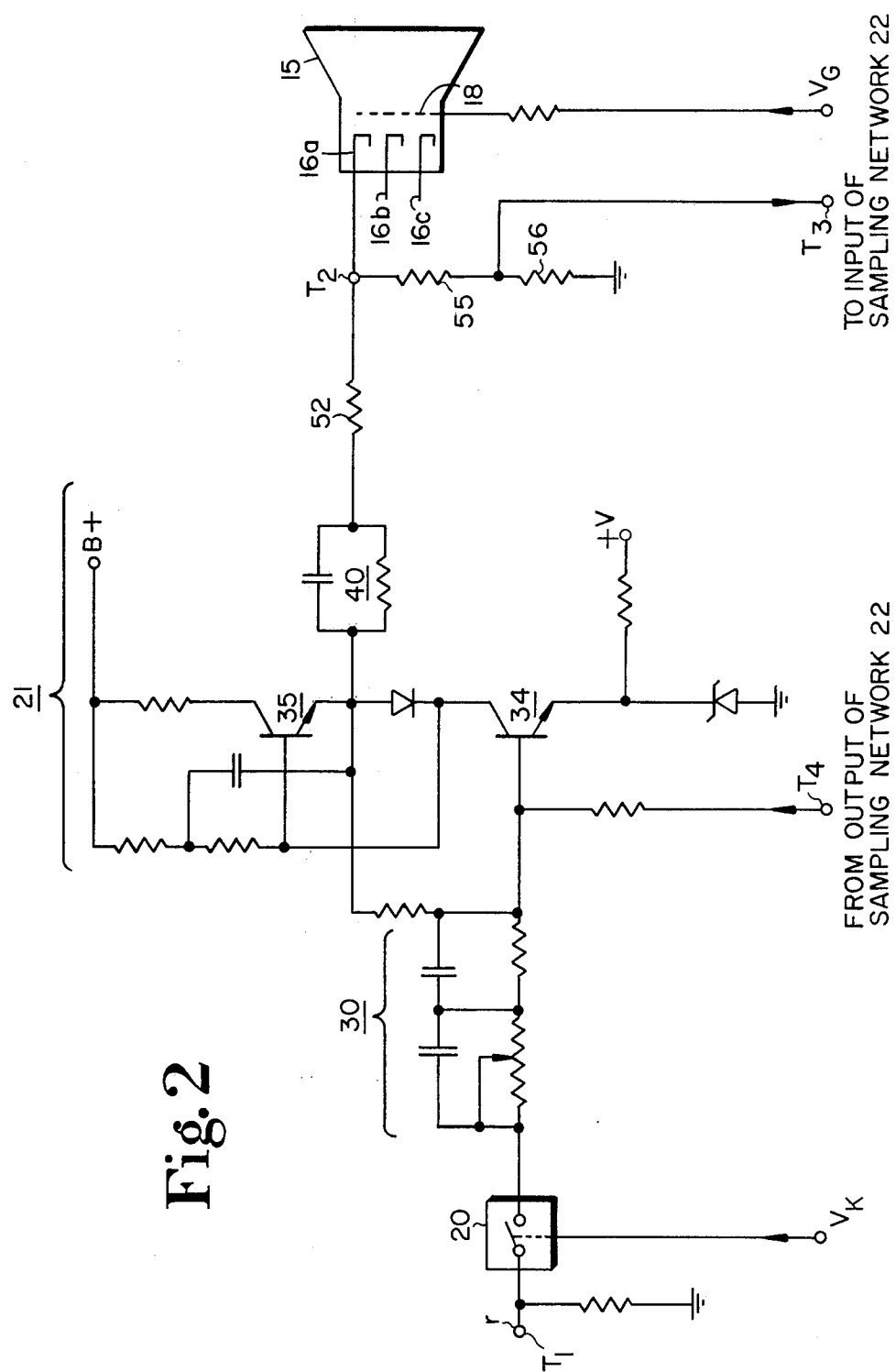
FIG. 2 shows a circuit arrangement of a portion of the system shown in FIG. 1.

FIG. 2 shows additional details of driver 21. Driver 21 comprises an amplifier transistor 34 and an active load circuit including a transistor 35. Under normal video signal processing conditions, the r color signal is coupled via a terminal $T_1$, gate 20 and an input circuit 30 to a base input of amplifier transistor 34. An amplified version of the input r is developed in the collector circuit of transistor 34, and is coupled to kinescope cathode 16a via an output coupling network 40, a resistor 52 and a terminal $T_2$. During the monitoring interval when input signal r is decoupled by means of gate 20, an induced cathode output pulse representative of the cathode black level current level appears at terminal $T_2$. The cathode output pulse is sensed by means of a high impedance voltage divider including resistors 55 and 56, and the sensed cathode output pulse is coupled via a terminal $T_3$ to the input of sampling network 22. An output control voltage from sampling network 22 is applied to the base of amplifier transistor 34 via a terminal $T_4$. In this example, cathode black level current conduction is modified to increase and decrease as the base bias current of transistor 34 increases and decreases, respectively, in response to the output control voltage from sampling network 22.

Figure 3:
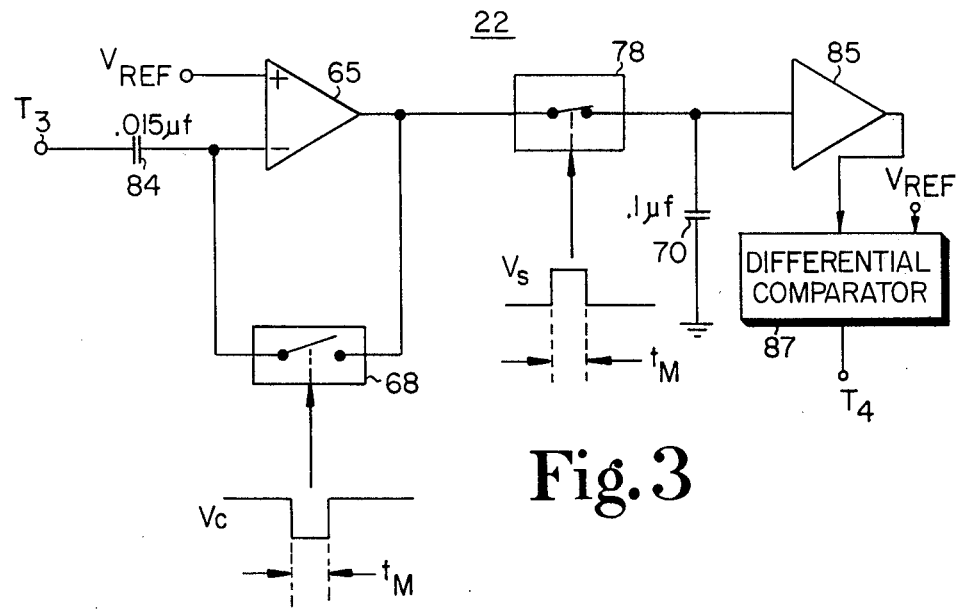
FIG. 3 shows a circuit arrangement of another portion of the system in FIG. 1, comprising a sampling network according to the present invention.

FIG. 3 shows sampling network 22 of FIG. 1 in greater detail.

In FIG. 3, the cathode output pulse coupled via terminal $T_3$ is processed by a sample and hold circuit comprising an inverting operational amplifier 65 (e.g., a voltage amplifier) with an associated feedback switch 68 (e.g., a bilateral switch) coupled between an output and an inverting (−) input of amplifier 65, and a peak detecting charge storage capacitor 70 coupled to the output of amplifier 65 via a sampling switch 78 (e.g., a bilateral switch). The non-inverting (+) input of amplifier 65 is coupled to a source of stable reference voltage $V_{REF}$. The sensed cathode output pulse is applied to the inverting input of amplifier 65 via terminal $T_3$ and a capacitor 84.

During the monitoring interval ($t_M$) which follows the reference interval, switch 68 is rendered nonconductive (opened, as shown) in response to a negative going timing pulse component of signal $V_C$. Also at this time, sampling switch 78 is rendered conductive (closed, as shown) in response to a positive going pulse component of signal $V_S$ for coupling the output of amplifier 65 (comprising an amplified but inverted version of the cathode output pulse induced by grid pulse $V_G$) to capacitor 70. The signal gain provided by amplifier 65 is significantly greater than unity and corresponds to the open loop voltage gain of voltage amplifier 65, so that a voltage sample of suitable magnitude is supplied to storage capacitor 70. The voltage sample stored on capacitor 70 is representative of the peak-to-peak amplitude of the cathode output pulse, and therefore also represents the level of cathode black level current conduction. The voltage on capacitor 70 is supplied via a coupling network 85 (e.g., a unity gain buffer amplifier) to one input of a differential comparator 87. Reference voltage $V_{REF}$ is applied to another input of comparator 87. Comparator 87 responds to the input voltages for providing a control signal at an inverting output representative of the difference between reference voltage $V_{REF}$ and the sample voltage from capacitor 70. This control voltage is supplied via a terminal $T_4$ to video driver 21 (FIG. 2) for controlling the bias thereof in a direction to compensate for excessively high or low cathode black level current conduction by closed loop feedback action.

In order for the voltage sample developed on capacitor 70 to accurately represent variations in the peak amplitude of the cathode output pulse, it is necessary for the amplitude of the output signal from sampling amplifier 65 to be referenced to a predictable level. It is also desirable for the amplifier output signal to be relatively free of significant offset errors such as can be attributable to input offsets of the sampling amplifier, so that the voltage sample is not distorted. Both of these results are obtained by the disclosed arrangement of amplifier 65 with reference voltage source $V_{REF}$, switch 68 and capacitor 84.

Figure 4:
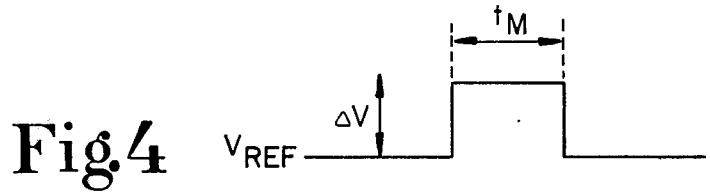
FIG. 4 depicts a waveform helpful in understanding the operation of the sampling network shown in FIG. 3.

During the reference interval preceding each monitoring interval $t_M$, switch 68 is rendered conductive (closed) in response to signal $V_C$. During these times sampling switch 78 is open or nonconductive. When switch 68 conducts, by feedback action the inverting input of amplifier 65 is clamped to the output level of amplifier 65, which is then at $V_{REF}$ potential, in cooperation with input capacitor 84. The effect of this input clamping action can be seen from the waveform of FIG. 4, wherein the positive-going cathode output pulse occurring during interval $t_M$ exhibits a (variable) peak-to-peak amplitude $\Delta V$ with respect to a stabilized reference level $V_{REF}$ produced by the clamping action. When enabled via sampling switch 78, capacitor 70 develops a voltage sample proportional to the difference between the fixed clamping reference level $V_{REF}$ and the amplified (but inverted) peak amplitude of the cathode output pulse.

The described input clamping arrangement including amplifier 65, clamping switch 68 and clamping capacitor 84 is particularly advantageous in a system for sampling low level signals such as that disclosed, since with this clamping arrangement input offsets of amplifier 65 and offsets associated with clamping switch 68 are not amplified by the signal gain of amplifier 65. Amplifier output errors are therefore reduced significantly.

In addition, in a system of the type shown it is desirable to provide a fast input RC time constant for the amplifier during the clamping intervals relative to the amplifier input time constant during the sampling intervals, so that capacitor 84 charges quickly to the clamping reference level via switch 68 during clamping intervals, and holds the charge over the sampling intervals. In the illustrated arrangement, the charging time of capacitor 84 for clamping purposes is determined by the value of capacitor 84, times the value of the conductive resistance of switch 68 divided by the gain of amplifier 65. Since the conductive resistance of switch 65 is typically small, and since the (open loop) gain of voltage amplifier 65 is considerably large in this example, the effective resistance component of this time constant is virtually insignificant. Thus a faster clamping time constant results compared to a time constant determined by the actual value of switch resistance. The input time constant during the sampling intervals is relatively slower (i.e., capacitor 84 discharges slowly) since this time constant is defined by the product of the value of capacitor 84 and the input impedance of amplifier 65, which is high in this example.

Figure 5:
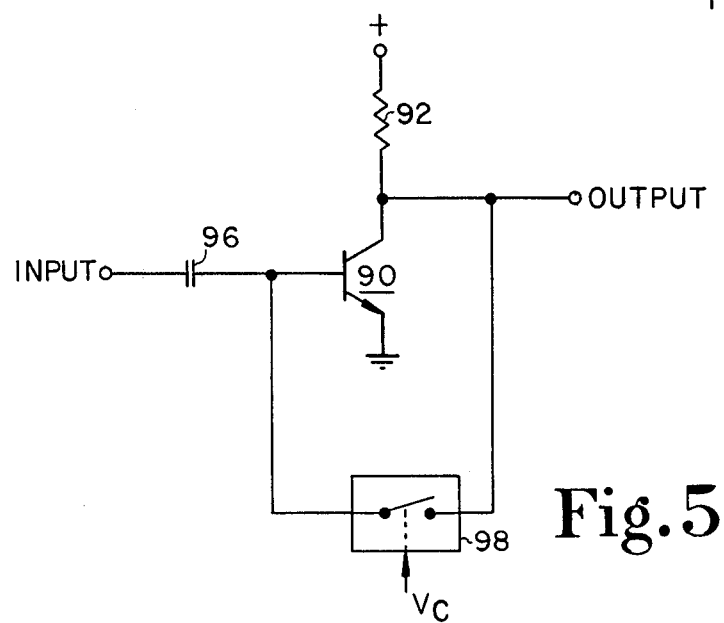
FIG. 5 shows an alternate arrangement of a portion of the circuit in FIG. 3.

FIG. 5 illustrates an alternative arrangement of amplifier 65, switch 68 and clamp capacitor 84 shown in FIG. 3.

The arrangement of FIG. 5 comprises a signal inverting common emitter amplifier transistor 90 with a signal gain proportional to the value of a collector resistor 92. Input signals are applied to a base input of transistor 90, corresponding to an inverting signal input, via a clamp capacitor 96. Inverted output signals appearing at the collector electrode of transistor 90 are supplied to a switched charge storage circuit such as corresponding to circuit 70, 78 in FIG. 3. A feedback switch 98 (shown in the open or nonconductive position) is connected between the collector output and base input electrodes of transistor 90.

When switch 98 is rendered conductive (closed) in response to signal $V_C$, the collector output of transistor 90 is coupled via switch 98 to the base input of transistor 90, which is forward biased so that approximately +0.7 volts (the base-emitter junction offset voltage of transistor 90) appears at the base and collector electrodes of transistor 90. The coaction of switch 98 with clamp capacitor 96 serves to clamp the base input to this (1 $V_{BE}$) voltage, which is a predictable voltage.

Switch 98 is rendered nonconductive during the monitoring intervals, at which time the cathode output pulse is coupled to transistor 90 and appears in inverted, amplified form at the collector output of transistor 90. The amplified cathode pulse is afterwards processed as noted in connection with FIG. 3.

Although the invention has been described with respect to preferred embodiments, it will be appreciated that other embodiments of the invention are possible in accordance with the principles of the invention as noted below, for example.

In the case where the sampling amplifier (e.g., amplifier 65 in FIG. 3) is a non-inverting amplifier, appropriate negative feedback can be provided for the amplifier during the clamping intervals by employing an inverter in the feedback path.

A feedback resistor connected between the output and inverting input of the sampling amplifier can be employed in combination with a resistor in the amplifier input signal path for determining a desired closed loop gain for the amplifier during the sampling intervals. In this case, however, care must be taken to assure that the amplifier input impedance and the amplifier input RC time constants are within acceptable limits during the clamping and sampling intervals.

What is claimed is:

1. A circuit for sampling an input signal having a reference interval and a signal interval including a characteristic to be sampled, comprising:

an amplifier with a signal input and an output;
a signal processing network;
a clamping network coupled to said amplifier signal input;
a switching network coupled to said amplifier output, to said clamping network, and to said signal processing network;
a source of timing signals including a clamping interval component corresponding to said reference interval of said input signal, and a sampling interval component corresponding to said signal interval of said input signal; and
means for coupling said timing signals to said switching network to render said switching network operative during said clamping intervals for (1) coupling said amplifier output to said clamping network at said amplifier signal input via a negative feedback path, and (2) decoupling said amplifier output from said signal processing network; and to render said switching network operative during said sampling intervals for (3) disabling said negative feedback path, and (4) coupling said amplifier output to said signal processing network.

2. A circuit according to claim 1, wherein:
said clamping network includes a capacitor arranged to couple said signals to be sampled to said amplifier input; and
said signal processing network comprises a charge storage device for developing a voltage sample in response to amplifier output signals referenced to a reference level.

3. A circuit according to claim 1, wherein:
said amplifier comprises an operational amplifier including an inverting signal input, a noninverting input, and an output;
said clamping network includes a capacitor arranged to couple said signals to be sampled to said amplifier inverting input;
a source of reference voltage is applied to said noninverting amplifier input; and
said switching network couples said amplifier output to said clamping capacitor at said inverting input during said clamping intervals.

4. A circuit according to claim 1, wherein:
said amplifier comprises a signal inverting amplifier including a transistor having an input electrode, and output and common electrodes defining a main current conduction path of said transistor between first and second points of operating potential;
said clamping network includes a capacitor arranged for coupling said signals to be sampled to said input electrode; and said switching network couples said amplifier output electrode to said clamping capacitor at said input electrode during said clamping intervals.

5. A circuit according to claim 4, wherein:
said input, output and common electrodes correspond to base, collector and emitter electrodes, respectively.

6. A circuit according to claims 3 or 4, wherein:
the signal gain of said amplifier during said sampling intervals corresponds to the open loop signal gain of said amplifier.

7. A circuit according to claim 1, wherein:
said switching network includes an input coupled to said amplifier output with substantially zero offset, and an output coupled to said amplifier input with substantially zero offset.

8. In combination with a system for automatically controlling the black level current conducted by a kinescope in a television receiver, said system including an image reproducing kinescope with an intensity control electron gun comprising a cathode electrode; means for coupling video signals including a periodic image display and image blanking intervals to said electron gun; and means for deriving a signal representative of the cathode current conduction level during periodic monitoring intervals within said blanking intervals; a circuit for sampling said representative signal to provide a control voltage, comprising:
an amplifier with a signal input for receiving said representative signal and an output;
a charge storage device;
a clamping network coupled to said amplifier signal input;
a switching network coupled to said amplifier output, to said clamping network, and to said charge storage device;
a source of timing signals including a clamping interval component occurring during an interval prior to said monitoring interval, and a sampling interval component occurring during said monitoring interval;
means for coupling said timing signals to said switching network to render said switching network operative during said clamping intervals for (1) coupling said amplifier output to said clamping network at said amplifier input via a negative feedback path, and (2) decoupling said amplifier output from said charge storage device; and to render said switching network operative during said sampling intervals for (3) disabling said negative feedback path, and (4) coupling said amplifier output to said charge storage device so that said charge storage device develops a voltage sample in response to amplifier output signals; and
means for utilizing said sample to develop said control voltage for modifying the bias of said kinescope so as to produce a desired level of kinescope black level current conduction.

9. A circuit according to claim 8, wherein:
said clamping network includes a capacitor arranged to couple said representative signal to said amplifier input.

10. A circuit according to claim 8, wherein:
said amplifier comprises an operational amplifier including an inverting signal input, a non-inverting input, and an output;
said clamping network includes a capacitor arranged to couple said signals to be sampled to said amplifier inverting input;
a source of reference voltage is applied to said non-inverting amplifier input; and
said switching network couples said amplifier output to said clamping capacitor at said inverting input during said clamping intervals.

11. A circuit according to claim 8, wherein:
said amplifier comprises a signal inverting amplifier including a transistor having an input electrode, and output and common electrodes defining a main current conduction path for said transistor between first and second points of operating potential;
said clamping network includes a capacitor arranged for coupling said signals to be sampled to said input electrode; and
said switching network couples said amplifier output electrode to said clamping capacitor at said input electrode during said clamping intervals.

12. A circuit according to claim 11, wherein:
said input, output and common electrodes correspond to base, collector and emitter electrodes, respectively.

13. A circuit according to claims 10 or 11, wherein:
the signal gain of said amplifier during said sampling intervals corresponds to the open loop signal gain of said amplifier.

14. A circuit according to claim 8, wherein:
said switching network includes an input coupled to said amplifier output with substantially zero offset, and an output coupled to said amplifier input with substantially zero offset.

15. A circuit according to claim 8, wherein:
said utilization means comprises means responsive to said voltage sample and to a reference voltage proportional to said clamping reference voltage for developing a voltage corresponding to said control voltage, representative of the difference between said voltage sample and said proportional reference voltage.

16. A circuit for sampling the amplitude characteristic of a signal having a reference interval and a signal interval including said amplitude characteristic, comprising:
an operational amplifier with an inverting input, a non-inverting input, and an output;
a coupling capacitor for coupling said signal to be sampled to said amplifier inverting input;
a source of D.C. reference potential coupled to said amplifier non-inverting input;
a storage capacitor;
a first switch D.C. coupled between said amplifier output and said storage capacitor;
a second switch D.C. coupled between said amplifier output and said amplifier inverting input; and
a source of timing signals coupled to said second switch for rendering said second switch conductive during said reference intervals and nonconductive during said signal intervals, and coupled to said first switch for rendering said first switch nonconductive during said reference intervals and conductive during said signal intervals.

* * * * *